US009112713B2

(12) United States Patent
Gandhi et al.

(10) Patent No.: US 9,112,713 B2
(45) Date of Patent: Aug. 18, 2015

(54) SYSTEM AND METHOD FOR EFFICIENT POINT-TO-MULTI-POINT TRAFFIC ENGINEERING (P2MP-TE) PATH PROTECTION

(75) Inventors: Rakesh Gandhi, Ontario (CA); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 13/534,543

(22) Filed: Jun. 27, 2012

(65) Prior Publication Data

US 2014/0003229 A1 Jan. 2, 2014

(51) Int. Cl.
*G01R 31/08* (2006.01)
*H04L 12/18* (2006.01)
*H04L 12/703* (2013.01)

(52) U.S. Cl.
CPC ............ *H04L 12/1863* (2013.01); *H04L 45/28* (2013.01); *H04L 12/185* (2013.01)

(58) Field of Classification Search
CPC ...... H04L 45/28; H04L 45/16; H04L 41/0654
USPC .................................................. 370/225, 228
See application file for complete search history.

(56) References Cited

U.S. PATENT DOCUMENTS

| | | | | |
|---|---|---|---|---|
| 8,773,978 | B2 * | 7/2014 | Chen | 370/218 |
| 2009/0245248 | A1 | 10/2009 | Arberg et al. | |
| 2012/0026866 | A1 * | 2/2012 | Venkataraman et al. | 370/225 |
| 2012/0033667 | A1 * | 2/2012 | Venkataraman et al. | 370/390 |

OTHER PUBLICATIONS

L. Jin, ZTE Corporation F Jounay France Telecom M Bhatia Alcatel-Lucent L: "Extensions to Resource Reservation Protocol—Traffic Engineering (RSVP-TE) for Hub and Spoke Multipoint Label Switched Paths (LSPs)"; draft-jjb-mpls-rsvp-te-hsmp-lsp-01.txt, Internet Engineering Task Force, IETF; Standardworkingdraft, Internet Societ, May 8, 2012, pp. 1-16, XPO15082773.
Notification of Transmittal of International Search Report and the Written Opinion of the International Search Authority, or the Declaration, mailed Oct. 25, 2013 in corresponding International Application No. PCT/US2013/048130, 9 pages.

* cited by examiner

*Primary Examiner* — Mark Rinehart
*Assistant Examiner* — Matthew Hopkins
(74) *Attorney, Agent, or Firm* — Parker Ibrahim & Berg LLC; James M. Behmke; Stephen D. LeBarron (57) ABSTRACT

A path protection method that includes: establishing a point to multi-point (P2MP) tree spanning from a head node to a plurality of tail nodes, the P2MP tree providing a label switched path (LSP) from the head node to a particular tail node; identifying a first and a second pluralities of source-to-leaf (S2L) sub-LSPs for the LSP included within the P2MP tree, each corresponding pair of S2L sub-LSP in the first and second pluralities are path diverse; setting a first flag in a RSVP path message to designate the second plurality of S2L sub-LSPs as protecting respective S2L sub-LSPs in the first plurality at a baseline level of protection; setting a second flag to designate a subset of S2L sub-LSPs in the second plurality as protecting respective S2L sub-LSPs in the first plurality at an elevated level of protection; and transmitting the RSVP path message.

20 Claims, 9 Drawing Sheets

SYSTEM AND METHOD FOR EFFICIENT POINT-TO-MULTI-POINT TRAFFIC ENGINEERING (P2MP-TE) PATH PROTECTION

TECHNICAL FIELD

The following disclosure relates generally to multi-cast communication in a packet-switched network.

BACKGROUND

Many service providers are widely deploying Point to Multi-point Traffic Engineering (P2MP-TE) tunnels to broadcast video traffic over the Internet. P2MP-TE may include the use of Resource Reservation Protocol (RSVP) signaling to set up Label Switched Paths (LSPs) for data traffic replication. Generally, protocols for setting up the LSPs have been defined in Request for Comments (RFC) 4875 (Extensions to RSVP-TE for P2MP TE LSPs).

DETAILED DESCRIPTIONS OF EXAMPLE EMBODIMENTS

Overview

An implementation provides for implementing path protection in multicasting. The implementation includes (1) establishing, by a head node, a point to multi-point (P2MP) tree spanning from the head node to a plurality of tail nodes, the P2MP tree including additional mid-point nodes, the P2MP tree providing a label switched path (LSP) from the head node to a particular tail node; (2) identifying, by the head node, a first plurality of source-to-leaf (S2L) sub-LSPs for the LSP, each S2L sub-LSP spanning over at least one mid-point node; (3) identifying, by the head node, a second plurality of S2L sub-LSPs for the LSP, the second plurality of S2L sub-LSPs included within the P2MP tree and each S2L sub-LSP spanning over at least one mid-point node, each S2L sub-LSP corresponding to a respective S2L sub-LSP in the first plurality, and each S2L sub-LSP in the second plurality and the respective S2L sub-LSP in the first plurality having no overlapping mid-point nodes; (4) setting, by the head node, a first flag of an object in a RSVP path message to designate the second plurality of S2L sub-LSPs as protecting respective S2L sub-LSPs in the first plurality at a baseline level of protection; (5) setting, by the head node, a second flag of the object in the RSVP path message to designate a subset of S2L sub-LSPs in the second plurality as protecting respective S2L sub-LSPs in the first plurality at an elevated level of protection, the second flag being different from the first flag; and (6) transmitting, from the head node to other nodes in the P2MP tree, the RSVP path message.

DETAILED DESCRIPTION

Point to Multi-point (P2MP) traffic engineering may realize broadcast/multicast data communication, for example, for video traffic. Typically, a P2MP tree is provided, which spans from a head node to a multitude of tail nodes. The head node is associated with the source of the broadcast/multicast while the tail nodes are associated with the receiver of the data communication. The P2MP tree generally includes additional mid-point nodes. The head node, mid-point nodes, and tail nodes are routing devices responsible for routing packets to their respective destination receiver. In a label switched network (e.g., a multi-protocol label switching network), a label switched path (LSP) connects the head node to a particular tail node by traversing additional mid-point nodes. A common quality of service (QoS) concern is how to deal with a failure of the LSP.

To provide path protection in traffic engineering (TE), a standby LSP that is path (or SRLG) diverse from the current LSP is configured before the broadcast/multicast commences. If the current LSP fails, network traffic on the current LSP will be immediately switched over to the standby LSP to minimize traffic loss, thus providing some level of redundancy in the network.

In case of P2MP-TE path protection, the head node may need to setup an entire standby P2MP LSP tree that is path (or SRLG) diverse from the current LSP tree. As the number of leaves in P2MP LSP tree increases, it may be more and more difficult to find an entire path/SRLG diverse tree in a network. Building another P2MP tree may also double book the bandwidth resources in the network, making the network less efficient. When only one or small number of source-to-leaf (S2Ls) sub-LSPs fail, path protection switchover can cause traffic switchover on the entire P2MP tree. This switchover may be less practical as the P2MP LSP tree grows and the associated overhead of switchover staggers.

The embodiments disclosed herein provide path protection on a finer granularity scale. In particular, the path protection is provided on a per source-to-leaf (S2L) sub-LSP basis, not on the basis for the entire P2MP LSP tree. Within the same P2MP tree (current LSP), each destination will have a group of primary S2Ls and a group of standby S2Ls. If a primary S2L sub-LSP fails, network traffic on the primary S2L sub-LSP can be re-routed to the respective standby S2L sub-LSP without affecting the traffic on the entire tree. This per S2L sub-LSP path protection method is practical and scalable.

In particular, for a LSP spanning from the head node to a particular tail node, the head node identifies the primary source-to-leaf (S2L) sub-LSPs for the LSP, each S2L sub-LSP spanning over at least one mid-point node. The head node also identifies the standby S2L sub-LSPs for the LSP, each S2L sub-LSP also spanning over at least one mid-point node. In addition, each standby S2L sub-LSP corresponds to a respective primary S2L sub-LSP. Moreover, each standby S2L sub-LSP and the respective primary S2L sub-LSP have no overlapping mid-point nodes, thus providing path diversity. The head node sets a first flag of an object in a Resource Reservation Protocol (RSVP) path message to designate standby S2L sub-LSPs as protecting respective primary S2L sub-LSPs. The default protection is at a baseline level. Under the baseline level of protection, the standby S2L sub-LSP will not carry traffic for the respective primary S2L sub-LSP until the primary S2L sub-LSP fails. The head node also may set a second flag of the object in the RSVP path message to designate a subset of the standby S2L sub-LSPs as protecting respective primary S2L sub-LSPs at an elevated level of protection. The second flag is different from the first flag. Under the elevated level of protection, the standby S2L sub-LSP carries traffic for the primary S2L sub-LSP even when the primary S2L sub-LSP is alive. The elevated level of protection is also referred to the live-live protection. The head node then transmits to other nodes in the P2MP tree the RSVP path message.

When the head node detects a failed primary S2L sub-LSP on a LSP to a particular tail node, the tail node initiates a switchover of data traffic from the failed primary S2L sub-LSP to the respective standby S2L sub-LSP only if the failed primary S2L sub-LSP is designated at the baseline level of protection. When the failed primary S2L sub-LSP is protected at the elevated level of protection (the live-live protection), the standby S2L sub-LSP already carries data traffic for the primary S2L sub-LSP even before the failure of the primary S2L sub-LSP. After initiating the switchover, the head node resets the first flag of the object in a RSVP path change message, and transmits the RSVP path change message to other nodes in the P2MP tree. The head node initiates the switchover by programming a new label-rewrite for the respective S2L sub-LSP in the second plurality; and sending subsequent packets on the new label-rewrite and under multi-protocol label switching (MPLS).

This application also discloses efficiently handling of remerge conditions in a per S2L path protection environment. In particular, the mid-point nodes of the P2MP tree are configured to accept a remerge between a standby S2L sub-LSP and the respective primary S2L sub-LSP, if the protection is at the elevated level. The mid-point nodes of the P2MP tree are further configured to reject a remerge between the given S2L sub-LSP and the respective S2L sub-LSP in the second plurality, if the given S2L sub-LSP in the first plurality is designated at the baseline level of protection.

The mid-point nodes of a primary S2L sub-LSP and mid-point nodes in the respective standby S2L sub-LSP are configured to share a common label under multi-protocol label switching (MPLS). The shared label can facilitate efficient switching in a label switched environment. Sharing of the label may help conserving the bandwidth resources in the network.

Some tail nodes can have the baseline level of protection while some tail nodes can have elevated level (live-live) of protection. If a tail node is under a live-live protection, then the tail node will allocate a new label for the standby S2L sub-LSP to receive double the traffic.

Figure 1:
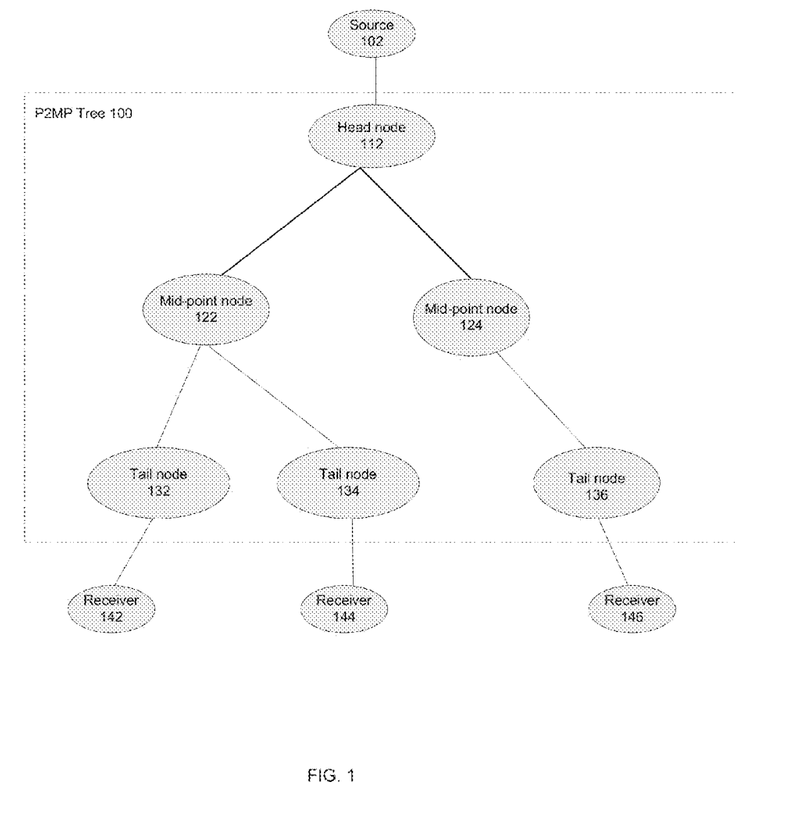
FIG. 1 is a diagram illustrating a P2MP tree from a head node to a multitude of tail nodes.

FIG. 1 is a diagram illustrating a P2MP tree 100 spanning from a head node 112 to a multitude of tail nodes, namely tail nodes 132, 134, and 136. The P2MP tree 100 connects source 102 to receivers 142, 144, and 146. The P2MP tree additionally includes mid-point nodes 122 and 124. A label switched path (LSP) from head node 112 to tail node 134 may traverse mid-point node 122. If an additional link (not shown in the figure) connects tail node 132 to tail node 134 on which tail node 132 can route network traffic to tail node 134, then a label switched path (LSP) from head node 112 to tail node 134 may additionally traverse tail node 132 source-to-leaf (S2L). In this instance, tail node 132 also serves as a mid-point node on this additional LSP and often referred to as a bud node.

In general, P2MP tree 100 may include a multitude of source-to-leaf (S2L) sub-LSPs to form an LSP. In RSVP signaling, a P2MP tree may be identified by a tunnel ID and an LSP ID, and each sub-LSP of a given LSP may be identified by an S2L ID. For example, P2MP tunnel ID 100 may include two P2MP trees from the same head-node to the same tail-node, for example, LSP IDs 4 and 5. Each P2MP tree can have 10 S2L sub-LSPs with S2L IDs 1 to 10. Each S2L sub-LSP may include mid-point node(s). For example, the above-mentioned additional LSP from head node 112 to tail node 134 (using link between nodes 132 and 134, not shown in the figure) includes S2L sub-LSPs that cover mid-point node 122 and tail node 132.

Figure 2:
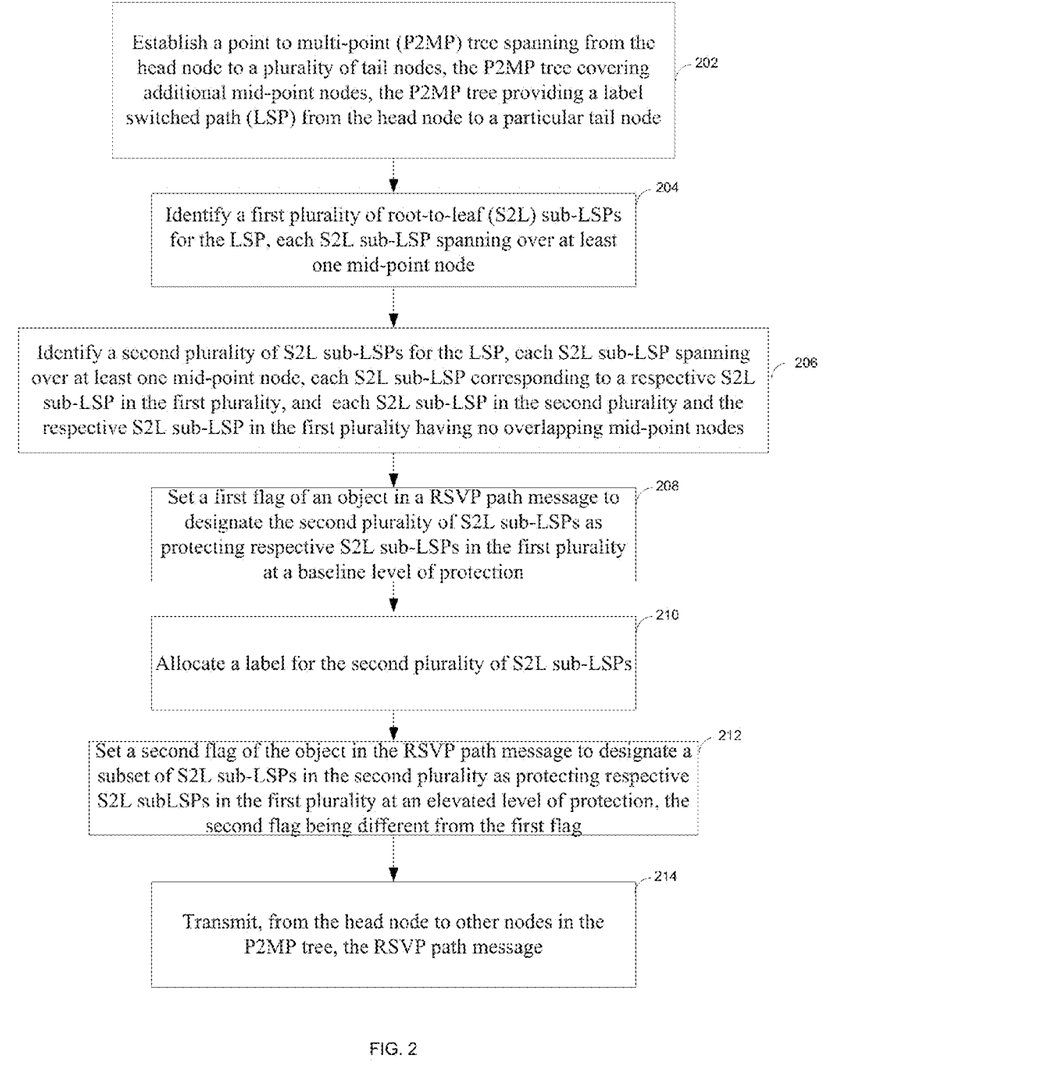
FIG. 2 is a flow chart illustrating an example method for efficient Point-to-Multi-point Traffic Engineering (P2MP-TE) path protection.

The head node, tail nodes, and mid-point nodes, as discussed in this application, are routing devices. Example routing devices may include a device that forwards data packets between computer networks, creating an overlay internetwork. A routing device is connected to two or more data lines from different networks. When a data packet comes in on one of the lines, the router reads the address or label information in the packet to determine its intended final destination. Then, the routing device may use information from its routing table or routing policy to direct the packet to the next network en-route to the final destination. The routing device may also use the label to direct the packet to the next network en-route to the final destination. A data packet is typically forwarded from one routing device to another until the data packet gets to its destination node FIG. 2 is a flow chart illustrating an example method for efficient Point-to-Multi-point Traffic Engineering (P2MP-TE) path protection. In block 202, a point to multi-point (P2MP) tree is established. The P2MP tree spans from the head node to a plurality of tail nodes. The P2MP tree includes additional mid-point nodes. The P2MP tree providing a label switched path (LSP) from the head node to a particular tail node. The LSP traverses at least one mid-point node.

The method then proceeds to block 204 in which a first plurality of source-to-leaf (S2L) sub-LSPs is identified for the LSP. Each S2L sub-LSP spans over at least one mid-point node. These S2L sub-LSPs, once concatenated, can form the LSP from the head node to one tail node. The first plurality of source-to-leaf (S2L) sub-LSPs may also be known as the primary S2Ls. Thereafter, the method proceeds to block 206 in which head node 112 identifies a second plurality of S2L sub-LSPs for the LSP in the same LSP instance. For example, head node 112 may set a newly defined flag in the LSP_ATTRIBUTES object (according to RFC4420) in the RSVP Path message per Table 1 below:

TABLE 1

Bit Number: TBD
Flag name: P2MP-TE Path Protection S2L

Each S2L sub-LSP in the second plurality spans over at least one mid-point node. Each S2L sub-LSP in the second plurality corresponds to a respective S2L sub-LSP in the first plurality. Each S2L sub-LSP in the second plurality and the respective S2L sub-LSP in the first plurality have no overlapping mid-point nodes. In other words, each S2L sub-LSP in the second plurality and the respective S2L sub-LSP in the first plurality are path diverse. The second plurality of source-to-leaf (S2L) sub-LSPs may also be known as the secondary or standby S2Ls.

In block 208, a first flag of an object in a RSVP path message is set. This first flag designates the second plurality of S2L sub-LSPs as protecting respective S2L sub-LSPs in the first plurality at a baseline level of protection. The baseline level of protection may also be known as the 1:1 protection in which a standby S2L only carries traffic for the respective primary S2L after a failure of the primary S2L, as will be discussed further in FIGS. 3A, 5A-5C.

In block 210, a label is allocated for the second plurality of S2L sub-LSPs. Head node 112 may transmit subsequent data packets on the allocated label. These labeled data packets are switched after a label lookup/switch instead of a lookup into the IP table. The label switching generally occurs at a lower layer (e.g., the data link layer and not the network layer). The label switching may be faster than a routing table or RIB (Routing Information Base) lookup because label switch could take place directly within the switched fabric and not the CPU. Thus, the label switching tends to be faster than IP routing.

In block 212, a second flag of an object in a RSVP path message is set. This second flag designates a subset of S2L sub-LSPs in the second plurality as protecting respective S2L sub-LSPs in the first plurality at an elevated level of protection. The elevated level of protection may also be known as the 1+1 or live-live protection under which the standby S2L carries traffic for the respective primary S2L before the primary S2L fails. In other words, the standby S2L provides a live backup under the elevated protection mode. The second flag is different from the first flag. For example, head node 112 may set another flag in the LSP_ATTRIBUTES object (according to RFC 4420) in the RSVP Path message per below:

TABLE 2

Bit Number: TBD
Flag name: P2MP-TE 1 + 1 Path Protection S2L (live-live)

Thereafter, in block 213, the head node transmits the RSVP message to other nodes in the P2MP tree 100 to set up the two pluralities of S2L sub-LSPs and reserve bandwidth at each mid-node in the P2MP tree 100.

Figure 3A:
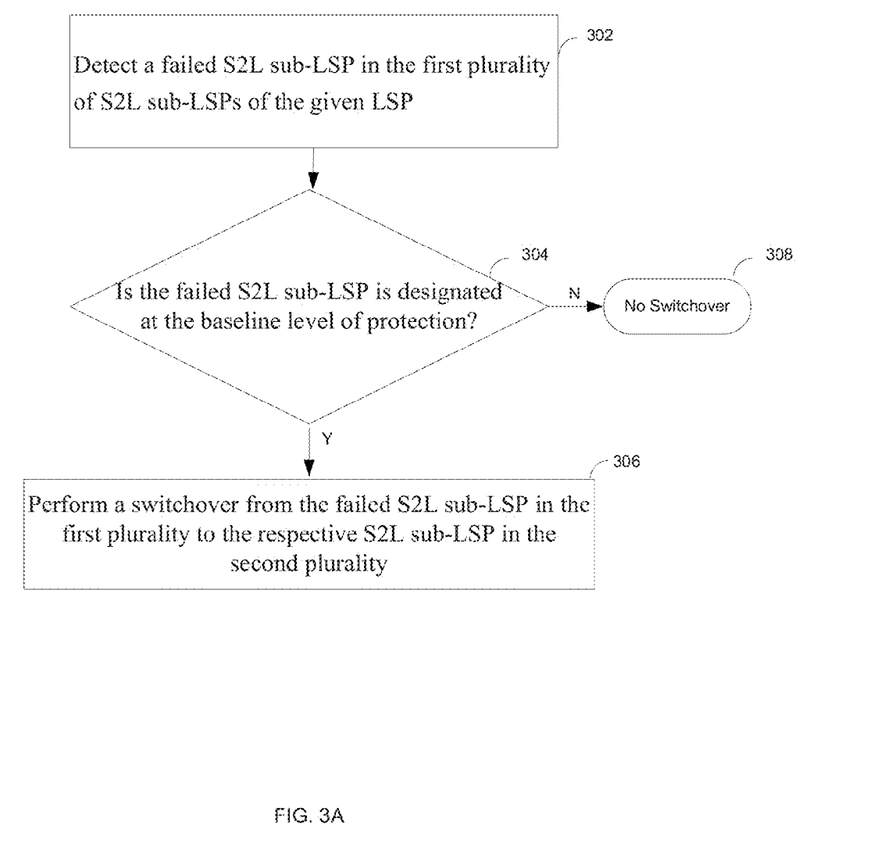
FIG. 3A is a flow chart illustrating an aspect of the example method in FIG. 2 for efficient Point-to-Multi-point Traffic Engineering (P2MP-TE) path protection.

FIG. 3A is a flow chart illustrating an aspect of the example method in FIG. 2 for efficient Point-to-Multi-point Traffic Engineering (P2MP-TE) path protection. In block 302, the head node 112 detects a failed S2L sub-LSP in the first plurality of S2L sub-LSPs. The first plurality of S2L sub-LSPs are associated with a particular LSP from head node 112 to a given tail node in P2MP tree 100.

The process then proceeds to block 304 in which head node 112 makes a determination as to whether the failed S2L sub-LSP is designated at the baseline level (aka the 1:1 protection). If the failed S2L sub-LSP is designated at the baseline level of protection, then the process will proceed to block 306 in which the head node will perform a switchover from the failed S2L sub-LSP in the first plurality to the respective S2L sub-LSP in the second plurality. If not, there will be no switchover, as indicated by block 308.

Figure 3B:
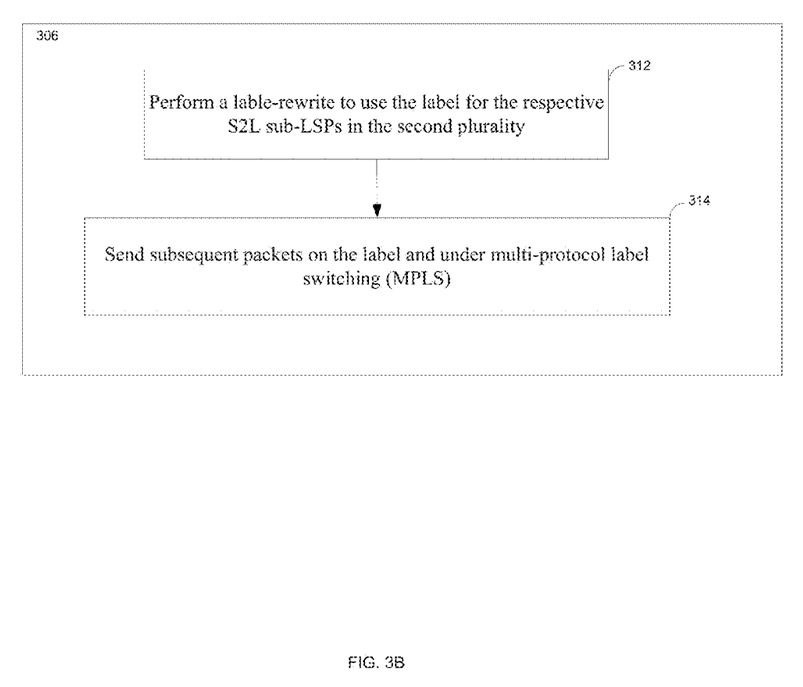
FIG. 3B is a flow chart illustrating block 306 in FIG. 3A for efficient Point-to-Multi-point Traffic Engineering (P2MP-TE) path protection.

FIG. 3B is a flow chart further illustrating block 306 in FIG. 3A for efficient Point-to-Multi-point Traffic Engineering (P2MP-TE) path protection. In block 312, head node 112 performs a new label-rewrite operation in order to use the label allocated in block 210 for the respective S2L sub-LSPs in the second plurality. In block 314, head node 314 sends subsequent data packets on the label allocated in block 210 and under the multi-protocol label switching (MPLS). As discussed above, the label switching tends to be faster than IP-routing.

Figure 4:
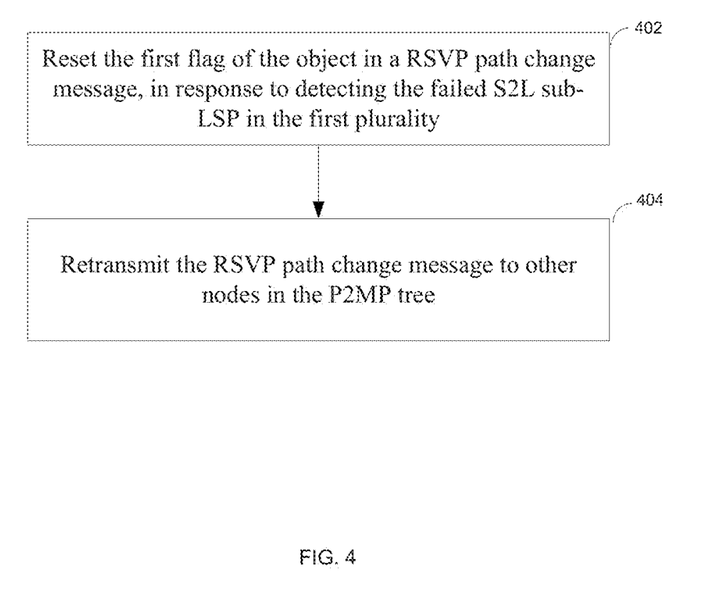
FIG. 4 is a flow chart illustrating another aspect of the example method in FIG. 2 for efficient Point-to-Multi-point Traffic Engineering (P2MP-TE) path protection.

FIG. 4 is a flow chart illustrating another aspect of the example method in FIG. 2 for efficient Point-to-Multi-point Traffic Engineering (P2MP-TE) path protection. In block 402, in response to detecting the failed primary S2L sub-LSP, head node 112 resets the first flag of the object in a RSVP path change message. The resetting deactivates the designation of the standby S2L sub-LSP, as the designation is no longer relevant. In block 404, head node 112 retransmits the RSVP path change message to other nodes in P2MP tree 100. The re-transmission will notify other nodes in the P2MP tree of the status update. Generally, there is no urgency for head node 112 to send the RSVP path change message; as long as the RSVP path change message is sent before head node 112 sets up a new standby S2L for the failed primary S2L.

Figure 5A:
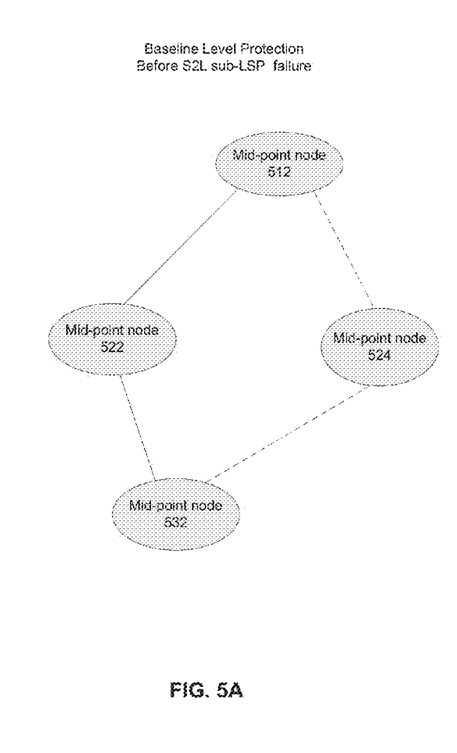
FIGS. 5A-5C illustrates an example sequence of events for efficient Point-to-Multi-point Traffic Engineering (P2MP-TE) path protection.
Figure 5B:
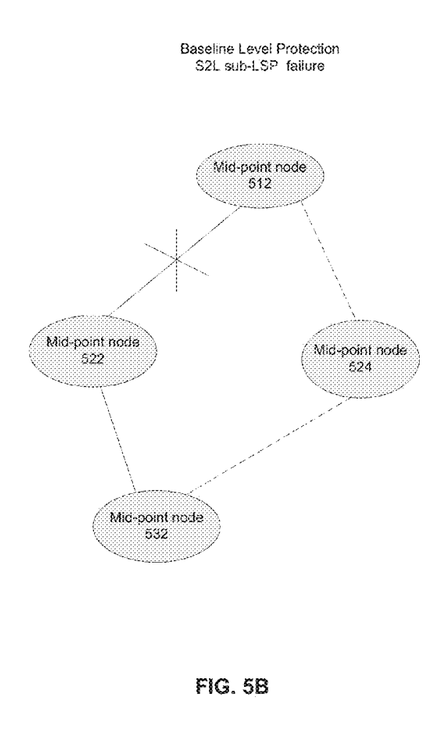
Figure 5C:
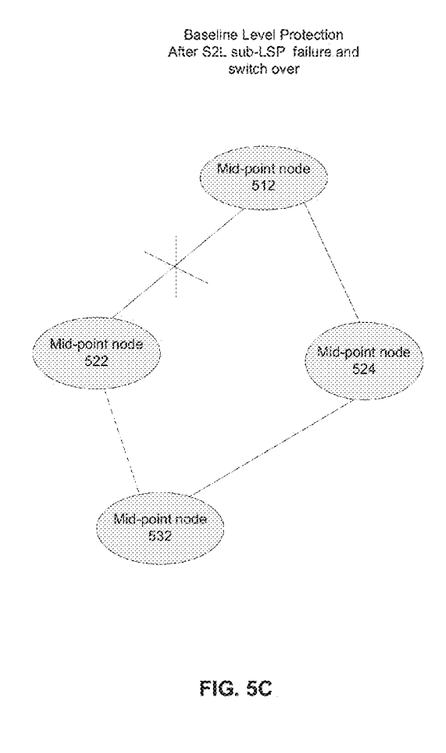

FIGS. 5A-5C illustrates an example sequence of events for efficient Point-to-Multi-point Traffic Engineering (P2MP-TE) path protection. FIG. 5A illustrates a primary S2L sub-LSP traversing mid-point nodes 512, 522, and 532 as well as a standby S2L sub-LSP traversing mid-points 512, 524, and 532. The primary S2L sub-LSP is illustrated as solid lines while the standby S2L sub-LSP is illustrated as dashed lines.

FIG. 5B illustrates a link failure between mid-point nodes 512 and 522 on the primary S2L sub-LSP. The link failure may be caused by a physical failure of the link (e.g., cable break, power outage at a routing device, etc.) or data congestion on the link (e.g., data traffic exceeding bandwidth limit of the link). After the link failure, mid-point node 512 can no longer transmit packets directly to mid-point node 522.

FIG. 5C illustrates the switchover in which the traffic on the primary S2L sub-LSP is now carried by the standby S2L sub-LSP. The solid line indicates active data traffic as a result of the switchover.

Figure 6A:
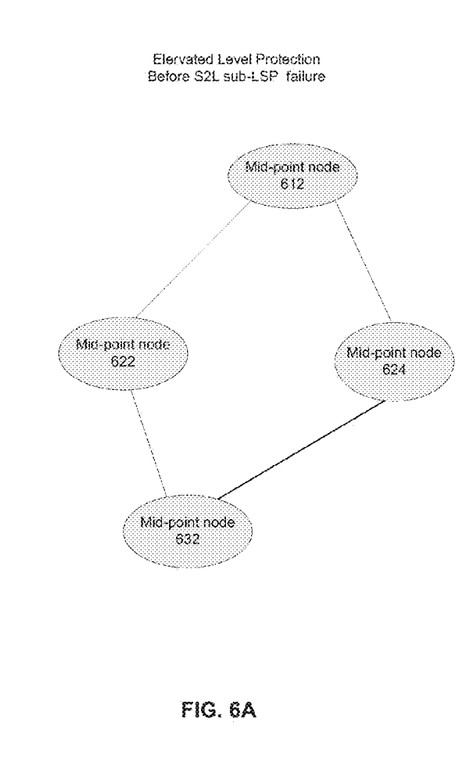
FIGS. 6A-6C illustrates another example sequence of events for efficient Point-to-Multi-point Traffic Engineering (P2MP-TE) path protection.
Figure 6B:
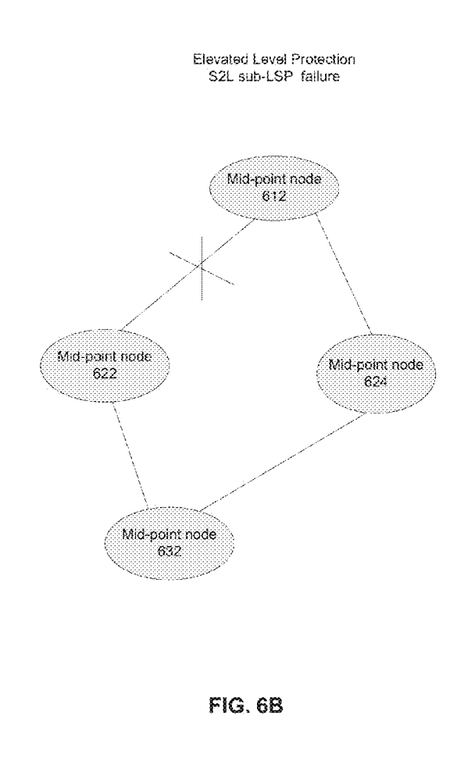
Figure 6C:
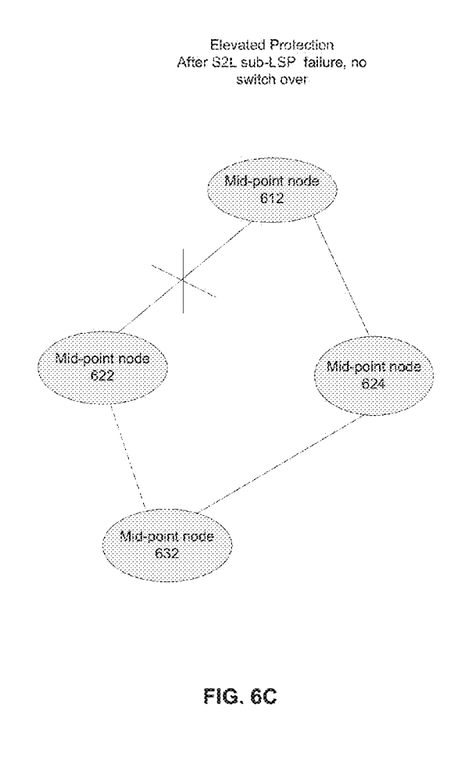

FIGS. 6A-6C illustrates another example sequence of events for efficient Point-to-Multi-point Traffic Engineering (P2MP-TE) path protection. FIG. 6A illustrates a primary S2L sub-LSP traversing mid-point nodes 612, 622, and 632 as well as a standby S2L sub-LSP traversing mid-points 612, 624, and 632. Both the primary S2L sub-LSP and the standby S2L sub-LSP are illustrated as solid lines because the primary S2L sub-LSP is under the elevated level of protection in which the standby S2L sub-LSP carries the network traffic for the primary S2L sub-LSP before any link failure.

FIG. 6B illustrates a link failure between mid-point nodes 612 and 622 on the primary S2L sub-LSP. A physical failure of the link or data congestion on the link can cause the link failure, as discussed above. After the link failure, mid-point node 612 can no longer transmit packets directly to mid-point node 622. However, a switchover is not necessary in this scenario because the primary S2L sub-LSP is protected at the elevated (live-live) level. As illustrated by FIG. 6C, the duplicate stream of data carried on the standby S2L sub-LSP reaches mid-point node 632.

Figure 7:
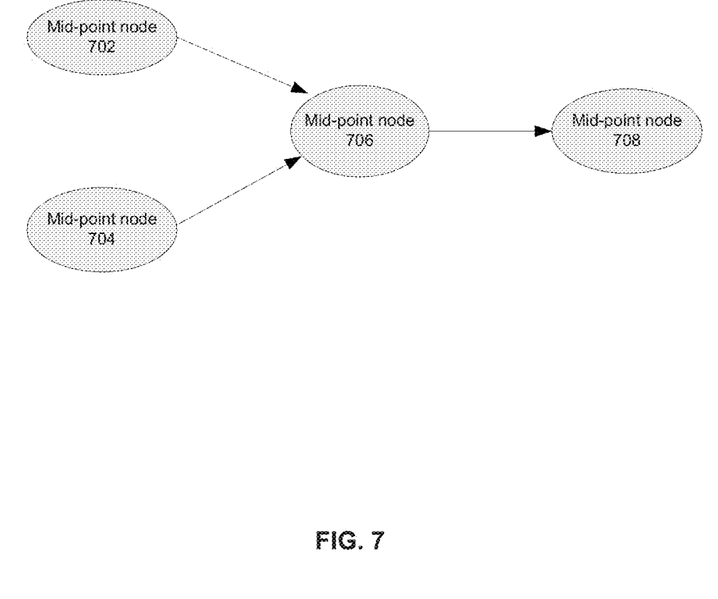
FIG. 7 is a diagram illustrating the handling of the remerge condition according to an example method.

FIG. 7 is a diagram illustrating the handling of the remerge condition according to an example method. Mid-point nodes 702 and 704, respectively on primary and standby S2L sub-LSPs, send data traffic to mid-point node 706, which then sends the data traffic to mid-point node 708. Remerge is a condition when mid-point node 706 has incoming traffic from nodes 702 and 704 but has only one outgoing path. Under the remerge condition, mid-point node 706 may send double the traffic from node 702 or node 704 to mid-point node 708. The additional amount of data traffic means that node 708 can get double the traffic under the baseline level of protection. Nonetheless, under the elevated level of protection, node 708 is already is aware of the duplicate data traffic from the standby S2L sub-SLP. When the link between mid-point nodes 702 and 706 fails, mid-point nodes 706 and 708 still will receive data traffic from the standby S2L sub-LSP through mid-point node 704.

Thus, a mid-point node only needs to accept the remerge condition between the primary and standby S2L sub-LSPs when the primary S2L sub-LSP is configured at the elevated level of protection. A mid-point node will reject the remerge condition between primary and standby S2L sub-LSPs when the primary is only set up at the baseline level of protection. The above differentiation is before a failure of the primary S2L sub-LSP, and before the path change message is sent, as illustrated by block 404 of FIG. 4.

The mid-point nodes of a primary S2L sub-LSP and mid-point nodes in the respective standby S2L sub-LSP are configured to share a common label under multi-protocol label switching (MPLS). The shared label can facilitate efficient switching in a label switched environment. Sharing of the label also may conserve bandwidth resources in the network.

Some tail nodes can have the baseline level of protection and some tail nodes can have elevated (live-live) level of protection. Thus, a particular tail node is configured to use different labels under multi-protocol label switching (MPLS) for the primary S2L sub-LSPs and standby S2L sub-LSPs, when the primary S2L sub-LSPs are designated as protected by the respective standby S2L sub-LSPs at the elevated level.

Figure 8:
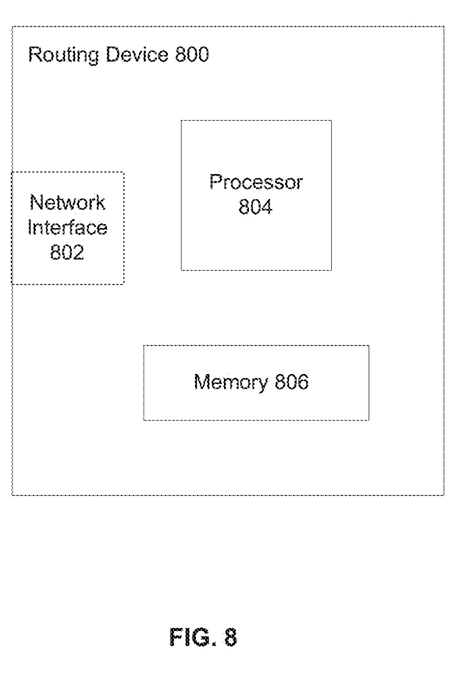
FIG. 8 is a diagram showing the functional blocks of an example node device.

FIG. 8 is a diagram showing the functional blocks of an example routing device 800. The head node, tail nodes, and mid-point nodes, as discussed in this application, are routing devices. An example routing device 800 includes network interface 802, processor 804 and memory 806. Routing device 800 receives data packets from other nodes and transmits the data packets to the next nodes en-route to the respective destinations of the data packets.

When a data packet received at the routing device 800, the data packet may be picked up by network interface 802. When a data packet leaves the routing device 800, the data packet may be transmitted by network interface 802 may be one of: a 10/100 Ethernet interface, a gigabit Ethernet interface, a Fiber Optics interface, a wireless interface, etc.

When a data packet is picked up by the network interface 802, processor 804 may read the address or label information in the packet to determine its intended final destination. Processor 804 may be any programmable processor, such as, for example, single-core, multi-core, big-endian, small-endian, etc. Process 804 may be based on logic array, such as, for example, field programmable gated array (FPGA). Processor 804 may also be based on digital signal processors (DSPs).

Routing device 800 may then use information stored as routing table or routing policy in memory 806 to direct the packet to the next network en-route to the final destination. Memory 806 may include any type of volatile memory devices including static random access memory (SRAM) and dynamic random access memory (DRAM). Memory 806 also may include any non-volatile memory devices such as, for example, read-only memory (ROM), erasable programmable read-only memory (EPROM), electrically erasable programmable read-only memory (EEPROM), compact disc (CD ROM), DVD-ROM, flash memory devices; magnetic disks, magneto optical disks, etc.

The routing device may also use the label to direct the packet to the next network en-route to the final destination. Compared to IP routing, label switching generally occurs at a lower layer (e.g., the data link layer and not the network or transport layer. Label switch could take place directly within the switched fabric and not the processor. Thus, label switching may be faster than a routing table or RIB (Routing Information Base) lookup.

When routing device 800 (e.g., a mid-point node) receives a RSVP message from a head node, the routing device 800 will configure the processing logic for handling subsequent data traffic accordingly. For example, routing device 800 may reserve adequate resources to provide the bandwidth for the standby S2L sub-LSP as instructed by the specified attributes in the RSVP message. The reservation may be, for example, per destination, per end-user, or per data-type.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for implementing path protection in multicasting, the method comprising:
    establishing, by a head node, a point to multi-point (P2MP) tree spanning from the head node to a plurality of tail nodes, the P2MP tree including additional mid-point nodes, the P2MP tree providing a label switched path (LSP) from the head node to a particular tail node;
    identifying, by the head node, a first plurality of source-to-leaf (S2L) sub-LSPs for the LSP, the first plurality of S2L sub-LSPs included within the P2MP tree and each S2L sub-LSP spanning over at least one mid-point node;
    identifying, by the head node, a second plurality of S2L sub-LSPs for the LSP, the second plurality of S2L sub-LSPs included within the P2MP tree and each S2L sub-LSP spanning over at least one mid-point node, each S2L sub-LSP corresponding to a respective S2L sub-LSP in the first plurality, and each S2L sub-LSP in the second plurality and the respective S2L sub-LSP in the first plurality having no overlapping mid-point nodes;
    setting, by the head node, a first flag of an object in a Resource Reservation Protocol (RSVP) path message to designate the second plurality of S2L sub-LSPs as protecting respective S2L sub-LSPs in the first plurality at a baseline level of protection;
    setting, by the head node, a second flag of the object in the RSVP path message to designate a subset of S2L sub-LSPs in the second plurality associated with the first flag as protecting respective S2L sub-LSPs in the first plurality at an elevated level of protection, the second flag being different from the first flag and set before the respective S2L sub-LSP in the first plurality has failed to allow carrying of packets for a respective S2L sub-LSP in the first plurality prior to failure of the respective S2L sub-LSP; and
    transmitting, from the head node to other nodes in the P2MP tree, the RSVP path message.

2. The method of claim 1, further comprising:
    detecting, by the head node, a failed S2L sub-LSP in the first plurality of S2L sub-LSPs of the given LSP; and
    in response to detecting the failed S2L sub-LSP, initiating, by the head node, a switchover from the failed S2L sub-LSP in the first plurality to the respective S2L sub-LSP in the second plurality of S2L sub-LSPs included within the P2MP tree only if the failed S2L sub-LSP is designated at the baseline level of protection.

3. The method of claim 2,
    wherein under the baseline level of protection, a particular S2L sub-LSP in the second plurality is configured to carry packets for a respective S2L sub-LSP in the first plurality only after the respective S2L sub-LSP in the first plurality has failed, and
    wherein under the elevated level of protection, a particular S2L sub-LSP in the second plurality is configured to carry packets for a respective S2L sub-LSP in the first plurality before the respective S2L sub-LSP in the first plurality has failed.

4. The method of claim 2, further comprising:
    resetting, by the head node, the first flag of the object in a RSVP path change message, in response to detecting the failed S2L sub-LSP in the first plurality; and
    transmitting, by the head node, the RSVP path change message to other nodes in the P2MP tree.

5. The method of claim 2, wherein the head node initiates the switchover by:
    using a label-rewrite to generate a new label-rewrite for the respective S2L sub-LSP in the second plurality; and
    sending subsequent packets on the new label-rewrite and under multi-protocol label switching (MPLS).

6. The method of claim 1, wherein the mid-point nodes are configured to:
    accept a remerge between a given S2L sub-LSP in the first plurality and the respective S2L sub-LSP in the second plurality, if the given S2L sub-LSP in the first plurality is designated at the elevated level of protection, and
    reject a remerge between the given S2L sub-LSP and the respective S2L sub-LSP in the second plurality, if the given S2L sub-LSP in the first plurality is designated at the baseline level of protection.

7. The method of claim 1, wherein mid-point nodes of a given S2L sub-LSP in the first plurality and mid-point nodes in a respective S2L sub-LSP in the second plurality are configured to share a common label under multi-protocol label switching (MPLS).

8. The method of claim 1, wherein the particular tail node is configured to use different labels under multi-protocol label switching (MPLS) for S2L sub-LSPs in the first plurality and S2L sub-LSPs in the second plurality, when the S2L sub-LSPs in the first plurality are designated as protected by the S2L sub-LSPs in the second plurality at the elevated level.

9. A computer system comprising: one or more processors and one or more storage devices storing instructions that are operable, when executed by the one or more processors, to cause the one or more processors to perform operations comprising:
    establishing a point to multi-point (P2MP) tree spanning from a head node to a plurality of tail nodes, the P2MP tree including additional mid-point nodes, the P2MP tree providing a label switched path (LSP) from the head node to a particular tail node;

identifying a first plurality of root-to-leaf (S2L) sub-LSPs for the LSP, the first plurality of S2L sub-LSPs included within the P2MP tree and each S2L sub-LSP spanning over at least one mid-point node;

identifying a second plurality of S2L sub-LSPs for the LSP, the second plurality of S2L sub-LSPs included within the P2MP tree and each S2L sub-LSP spanning over at least one mid-point node, each S2L sub-LSP corresponding to a respective S2L sub-LSP in the first plurality, and each S2L sub-LSP in the second plurality and the respective S2L sub-LSP in the first plurality having no overlapping mid-point nodes;

setting a first flag of an object in a RSVP path message to designate the second plurality of S2L sub-LSPs as protecting respective S2L sub-LSPs in the first plurality at a baseline level of protection;

setting a second flag of the object in the RSVP path message to designate a subset of S2L sub-LSPs in the second plurality associated with the first flag as protecting respective S2L sub-LSPs in the first plurality at an elevated level of protection, the second flag being different from the first flag and set before the respective S2L sub-LSP in the first plurality has failed to allow carrying of packets for a respective S2L sub-LSP in the first plurality prior to failure of the respective S2L sub-LSP; and transmitting the RSVP path message from the head node to other nodes in the P2MP tree.

10. The computer system of claim 9, wherein the operations further comprise:

detecting a failed S2L sub-LSP in the first plurality of S2L sub-LSPs of the given LSP; and in response to detecting the failed S2L sub-LSP, initiating a switchover from the failed S2L sub-LSP in the first plurality to the respective S2L sub-LSP in the second plurality of S2L sub-LSPs included within the P2MP tree only if the failed S2L sub-LSP is designated at the baseline level of protection.

11. The computer system of claim 10, wherein under the baseline level of protection, a particular S2L sub-LSP in the second plurality is configured to carry packets for a respective S2L sub-LSP in the first plurality only after the respective S2L sub-LSP in the first plurality has failed, and wherein under the elevated level of protection, a particular S2L sub-LSP in the second plurality is configured to carry packets for a respective S2L sub-LSP in the first plurality before the respective S2L sub-LSP in the first plurality has failed.

12. The computer system of claim 10, further comprising:

resetting the first flag of the object in a RSVP path change message, in response to detecting the failed S2L sub-LSP in the first plurality; and transmitting the RSVP path change message to other nodes in the P2MP tree.

13. The computer system of claim 10, wherein the head node initiates the switchover by:

using a label-rewrite to generate a new label-rewrite for the respective S2L sub-LSP in the second plurality; and sending subsequent packets on the new label-rewrite and under multi-protocol label switching (MPLS).

14. The computer system of claim 9, wherein the mid-point nodes are configured to:

accept a remerge between a given S2L sub-LSP in the first plurality and the respective S2L sub-LSP in the second plurality, if the given S2L sub-LSP in the first plurality is designated at the elevated level of protection, and reject a remerge between the given S2L sub-LSP and the respective S2L sub-LSP in the second plurality, if the given S2L sub-LSP in the first plurality is designated at the baseline level of protection.

15. A computer program product, embodied in a non-transitory machine-readable medium and including instructions executable by a processor, the instructions operable to cause the processor to perform functions including:

establishing a point to multi-point (P2MP) tree spanning from a head node to a plurality of tail nodes, the P2MP tree including additional mid-point nodes, the P2MP tree providing a label switched path (LSP) from the head node to a particular tail node;

identifying a first plurality of root-to-leaf (S2L) sub-LSPs for the LSP, the first plurality of S2L sub-LSPs included within the P2MP tree and each S2L sub-LSP spanning over at least one mid-point node;

identifying a second plurality of S2L sub-LSPs for the LSP, the second plurality of S2L sub-LSPs included within the P2MP tree and each S2L sub-LSP spanning over at least one mid-point node, each S2L sub-LSP corresponding to a respective S2L sub-LSP in the first plurality, and each S2L sub-LSP in the second plurality and the respective S2L sub-LSP in the first plurality having no overlapping mid-point nodes;

setting a first flag of an object in a RSVP path message to designate the second plurality of S2L sub-LSPs as protecting respective S2L sub-LSPs in the first plurality at a baseline level of protection;

setting a second flag of the object in the RSVP path message to designate a subset of S2L sub-LSPs in the second plurality associated with the first flag as protecting respective S2L sub-LSPs in the first plurality at an elevated level of protection, the second flag being different from the first flag and set before the respective S2L sub-LSP in the first plurality has failed to allow carrying of packets for a respective S2L sub-LSP in the first plurality prior to failure of the respective S2L sub-LSP; and transmitting the RSVP path message from the head node to other nodes in the P2MP tree.

16. The computer program product of claim 15, wherein the operations further comprise:

detecting a failed S2L sub-LSP in the first plurality of S2L sub-LSPs of the given LSP; and in response to detecting the failed S2L sub-LSP, initiating, by the head node, a switchover from the failed S2L sub-LSP in the first plurality to the respective S2L sub-LSP in the second plurality of S2L sub-LSPs included within the P2MP tree only if the failed S2L sub-LSP is designated at the baseline level of protection.

17. The computer program product of claim 16, wherein under the baseline level of protection, a particular S2L sub-LSP in the second plurality is configured to carry packets for a respective S2L sub-LSP in the first plurality only after the respective S2L sub-LSP in the first plurality has failed, and wherein under the elevated level of protection, a particular S2L sub-LSP in the second plurality is configured to carry packets for a respective S2L sub-LSP in the first plurality before the respective S2L sub-LSP in the first plurality has failed.

18. The computer program product of claim 16, further comprising:

resetting the first flag of the object in a RSVP path change message, in response to detecting the failed S2L sub-LSP in the first plurality; and transmitting the RSVP path change message to other nodes in the P2MP tree.

19. The computer program product of claim 16, wherein the head node initiates the switchover by:

using a label-rewrite to generate a new label-rewrite for the respective S2L sub-LSP in the second plurality; and sending subsequent packets on the new label-rewrite and under multi-protocol label switching (MPLS).

20. The computer program product of claim 15, wherein the mid-point nodes are configured to:

accept a remerge between a given S2L sub-LSP in the first plurality and the respective S2L sub-LSP in the second plurality, if the given S2L sub-LSP in the first plurality is designated at the elevated level of protection, and reject a remerge between the given S2L sub-LSP and the respective S2L sub-LSP in the second plurality, if the given S2L sub-LSP in the first plurality is designated at the baseline level of protection.

\* \* \* \* \*